Patented Dec. 7, 1926.

1,609,303

UNITED STATES PATENT OFFICE.

LEOPOLDO PARODI-DELFINO, OF ROME, ITALY.

METHOD OF MANUFACTURING NITROGLYCERIN-NITROCELLULOSE POWDERS.

No Drawing. Application filed September 22, 1925. Serial No. 57,943, and in Italy November 18, 1924.

The substances commonly used for gelatinizing nitrocellulose have not given quite satisfactory results, and attempts have been made to substitute more suitable materials therefor.

My present invention is a method for gelatinizing nitrocellulose with substances hitherto unknown for this purpose and showing notable advantages over all of the volatile or non-volatile gelatinizing substances hitherto used for manufacturing nitrocompound powders and celluloid.

Such substances are phthalide

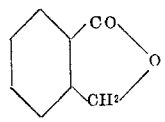

and its homologues which besides their non-volability present notable advantages even over the most generally used non-volatile gelatinizing substances. Phthalide has great chemical stability and therefore prevents or delays the dangerous decomposition smokeless powders are subjected to, thereby being an energetic stabilizing means. Furthermore contrary to the numerous gelatinizing substances derived from urea or urethane it is not liable to scissions leading to basic products (amines) which, in turn, may be the cause of decomposition of the nitric ethers.

Phthalide and its homologues may be mainly used in manufacturing nitrocellulose powders with or without nitroglycerin, or celluloid, by wholly or partially substituting the said substances for the gelatinizing materials hitherto used.

For nitrocellulose powders with nitroglycerin my new method has special importance because of its permitting to further reduce the percentage of nitroglycerin without incurring the drawbacks of volatile solvents, whilst leaving the plasticity of the powders unaltered so that they may be easily rolled or drawn, and giving them great stability, thereby obtaining the advantage of having lower explosion temperatures and consequently less erosion at the mouth of ordnance pieces.

The introduction of phthalide in the said powders may be effected by dissolving it in the nitroglycerin which is to impregnate the nitrocellulose, and the process is thereafter continued in the usual manner by rolling or drawing the mixture with or without the addition of a volatile solvent.

The following is an example of numerous compositions containing phthalide or its homologues which may be used for obtaining a cannon powder for ballistic purposes: nitrocellulose, 12 parts; nitroglycerin, from 4-6 parts; phthalide or its homologues, from 1-4 parts.

This composition may be varied in respect to proportions according to the particular purpose the powder is designed for.

Having now particularly described and ascertained the nature of my said invention and in what manner the same is to be performed, I declare that what I claim is:—

1. In the herein described process of manufacturing nitroglycerin powders, the step which consists in introducing into nitrocellulose a substance of the class comprising phthalide and its homologues.

2. The herein described process of manufacturing nitroglycerin powders, which consists in dissolving in nitroglycerin a substance of the class comprising phthalide and its homologues, and impregnating nitrocellulose with the solution.

3. The herein described process of manufacturing nitroglycerin powders, which consists in dissolving from one to four parts of a substance of the class comprising phthalide and its homologues in from four to six parts of nitroglycerin, and impregnating twelve parts of nitrocellulose with the solution.

In testimony whereof I have hereunto signed my name.

LEOPOLDO PARODI-DELFINO.